United States Patent
Drummond et al.

(10) Patent No.: US 7,728,276 B2
(45) Date of Patent: Jun. 1, 2010

(54) VEHICLE REARVIEW MIRROR SYSTEM

(75) Inventors: John P. Drummond, Glenageary (IE); Kenneth Schofield, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 12/473,863

(22) Filed: May 28, 2009

(65) Prior Publication Data

US 2009/0237799 A1  Sep. 24, 2009

Related U.S. Application Data

(60) Continuation of application No. 12/268,009, filed on Nov. 10, 2008, now Pat. No. 7,541,570, which is a continuation of application No. 12/029,172, filed on Feb. 11, 2008, now Pat. No. 7,453,057, which is a continuation of application No. 11/735,777, filed on Apr. 16, 2007, now Pat. No. 7,329,850, which is a continuation of application No. 10/955,694, filed on Sep. 30, 2004, now Pat. No. 7,205,524, which is a division of application No. 10/427,026, filed on Apr. 30, 2003, now Pat. No. 6,918,674.

(60) Provisional application No. 60/377,561, filed on May 3, 2002, provisional application No. 60/426,227, filed on Nov. 14, 2002.

(51) Int. Cl.
*H01J 40/14* (2006.01)
*G01J 1/44* (2006.01)

(52) U.S. Cl. .................. 250/214 AL; 250/214 C; 250/214 R; 250/205; 359/604

(58) Field of Classification Search .............. 250/221, 250/208.1, 216, 205, 214 R, 214 AL, 214 B, 250/214 C; 359/601, 602, 604, 605, 608, 359/609; 362/494, 540
See application file for complete search history.

(56) References Cited

U.S. PATENT DOCUMENTS

| | | | |
|---|---|---|---|
| 3,600,951 A | 8/1971 | Easton |
| 3,601,614 A | 8/1971 | Platzer, Jr. |
| 4,443,057 A | 4/1984 | Bauer et al. |
| 4,793,690 A | 12/1988 | Gahan et al. |
| 4,799,768 A | 1/1989 | Gahan |
| 4,882,565 A | 11/1989 | Gallmeyer |
| 4,886,960 A | 12/1989 | Molyneux et al. |
| 4,916,307 A | 4/1990 | Nishibe et al. |
| 4,917,477 A | 4/1990 | Bechtel et al. |
| 4,930,742 A | 6/1990 | Schofield et al. |
| 5,193,029 A | 3/1993 | Schofield et al. |

(Continued)

*Primary Examiner*—Kevin Pyo
(74) *Attorney, Agent, or Firm*—Van Dyke, Gardner, Linn & Burkhart, LLP

(57) ABSTRACT

A vehicle rearview mirror system includes a transflective reflective element, an ambient light sensor that senses ambient light and a glare light sensor that senses glare light. A control circuit establishes a reflectance level of the reflective element, and the control circuit is responsive to light detection by at least one of the ambient light sensor and the glare light sensor. A display element is disposed behind the reflective element and operable to display information through the reflective element and viewable through the mirror reflector of the reflective element by a driver of the vehicle when the display element displays information, and substantially non-viewable by the driver of the vehicle when the display element does not display information. A display intensity control adjusts display intensity responsive to a light detection by at least one of the glare light sensor and the ambient light sensor.

21 Claims, 10 Drawing Sheets

U.S. PATENT DOCUMENTS

| | | |
|---|---|---|
| 5,214,274 A | 5/1993 | Yang |
| 5,220,317 A | 6/1993 | Lynam et al. |
| 5,451,822 A | 9/1995 | Bechtel et al. |
| 5,666,028 A | 9/1997 | Bechtel et al. |
| 5,715,093 A | 2/1998 | Schierbeek et al. |
| 5,760,962 A | 6/1998 | Schofield et al. |
| 6,008,486 A | 12/1999 | Stam et al. |
| 6,056,410 A | 5/2000 | Hoekstra et al. |
| 6,089,721 A | 7/2000 | Schierbeek |
| 6,346,698 B1 | 2/2002 | Turnbull |
| 6,359,274 B1 | 3/2002 | Nixon et al. |
| 6,379,013 B1 | 4/2002 | Bechtel et al. |
| 6,402,328 B1 | 6/2002 | Bechtel et al. |
| 6,863,405 B2 | 3/2005 | Bechtel et al. |
| 6,918,674 B2 | 7/2005 | Drummond et al. |
| 6,936,807 B1 | 8/2005 | Su et al. |
| 7,205,524 B2 | 4/2007 | Drummond et al. |
| 7,306,355 B2 | 12/2007 | Walser et al. |
| 7,329,850 B2 | 2/2008 | Drummond et al. |
| 7,453,057 B2 | 11/2008 | Drummond et al. |
| 7,541,570 B2 | 6/2009 | Drummond et al. |
| 2002/0003571 A1 | 1/2002 | Schofield et al. |
| 2002/0159270 A1 | 10/2002 | Lynam et al. |
| 2007/0171037 A1 | 7/2007 | Schofield et al. |
| 2009/0015736 A1 | 1/2009 | Weller et al. |
| 2009/0065683 A1* | 3/2009 | Drummond et. ... 250/214 AL |
| 2009/0290369 A1* | 11/2009 | Schofield et al. ............ 362/494 |

* cited by examiner

VEHICLE REARVIEW MIRROR SYSTEM

CROSS REFERENCE TO RELATED APPLICATIONS

The present application is a continuation of U.S. patent application Ser. No. 12/268,009, filed Nov. 10, 2008, now U.S. Pat. No. 7,541,570, which is a continuation of U.S. patent application Ser. No. 12/029,172, filed Feb. 11, 2008, now U.S. Pat. No. 7,453,057, which is a continuation of U.S. patent application Ser. No. 11/735,777, filed Apr. 16, 2007, now U.S. Pat. No. 7,329,850, which is a continuation of U.S. patent application Ser. No. 10/955,694, filed Sep. 30, 2004, now U.S. Pat. No. 7,205,524, which is a division of U.S. patent application Ser. No. 10/427,026, filed Apr. 30, 2003, now U.S. Pat. No. 6,918,674, which claims priority of U.S. provisional applications, Ser. No. 60/377,561, filed May 3, 2002; and Ser. No. 60/426,227, filed Nov. 14, 2002, which are all hereby incorporated herein by reference in their entireties.

FIELD OF THE INVENTION

The present invention relates generally to vehicle rearview mirror systems and, more particularly, to such mirror systems having self-dimming mirrors, and to such mirror systems having a display in a rearview mirror.

BACKGROUND OF THE INVENTION

Automatic rearview mirrors which automatically control the glare from the headlights of following vehicles, or when driving away from the setting sun, have been produced and installed in vehicles for many years. Glare reflected in these mirrors has been adjusted by employing motorized prismatic mirrors, liquid crystal shutters and, most successfully, electrochromic mirror reflective elements in which the reflectivity of the mirror is responsive to an applied voltage. While a variety of light measuring and control systems have been proposed and used, such as described in U.S. Pat. No. 3,601,614 issued to Platzer, Jr. and U.S. Pat. No. 3,600,951 issued to Jordan et al., among others, a particularly successful commercial system has relied on two cadmium sulfide light sensors, one sensing ambient light levels and the other sensing rearward glare sources. Typical control systems utilizing this type of devices are described in commonly assigned U.S. Pat. No. 5,715,093 issued to Schierbeek et al.

Many of the characteristics of cadmium sulfide light sensors are well suited to the functional objectives of an automatic mirror control circuit, and their use has contributed to the cost effectiveness of the mirror system in which they are used and the consequent commercial success of these systems.

In recent years, efforts have been made to eliminate cadmium from vehicle systems. In one such effort undertaken in Europe, the vehicle is designed to be recycled, and material, such as cadmium, is restricted. Consequently, it is desirable to utilize light sensors in automatic rearview mirror control circuits which are based upon alternative materials and ideally which achieve the response in performance and cost previously achieved with circuits utilizing cadmium sulfide devices. In this manner, the manufacturer can continue to offer the comfort and advantages of glare control mirrors to the driving public at affordable prices.

Attempts have been made in the art involving vehicle rearview mirror systems having tandem light sensors and light signals that are integrated over predetermined integration periods. Examples of such art include U.S. Pat. Nos. 6,008,486; 6,359,274; 6,379,013 and 6,402,328, the disclosures of which are hereby incorporated herein by reference.

It is also known to provide a display through a mirrored electrochromic cell of an electrochromic mirror, while blocking the view of the display structure or device through the mirrored surface. When such a display is implemented in an interior rearview mirror assembly of a vehicle, it is possible to provide the driver of the vehicle with the full use of the mirror surface when the data display is not required or activated. This also allows the use of a larger display area, and consequently, a larger character size, than is typically possible when the display is located in the mirror frame or bezel, or if a permanent non-mirrored display window is provided within the mirror area. Such a display is commonly referred to as "display on demand".

Although a display on demand provides the above benefits to a driver of the vehicle, such a display requires brightness or intensity control of the display for optimum readability in all lighting conditions. Traditional rearview mirror displays have a relatively constant brightness background field on which characters are displayed, such as a dark lens surface with low reflectivity or the like. In such displays, it is typical to control the display brightness according only to ambient lighting conditions, such that in bright ambient lighting conditions, the display is bright enough to read, but in low ambient lighting conditions, the display is not so bright that it is annoying or distracting to the driver of the vehicle. For example, a very bright display in dark driving conditions can reduce the driver's ability to discern detail in the forward view, since such a display may cause the driver's pupils to adjust in order to accommodate the bright light source. However, because the reflectivity of a reflective element of an electrochromic mirror is variable or adjustable, the intensity of the display may be further controlled or adjusted to maintain a desired contrast ratio between the display and the reflected scene.

SUMMARY OF THE INVENTION

The present invention provides for the utilization of commercially available, low cost, silicon-based light-sensing devices in automatic rearview mirror control systems. The present invention also provides a control for a display through a mirrored surface of a vehicular rearview mirror which is operable to adjust the intensity or brightness of the display in response to the brightness of a scene rearward of the vehicle.

A vehicle rearview mirror system, according to an aspect of the invention, includes an electro-optic reflective element, an ambient light sensor that is operable to sense ambient light, a glare light sensor that is operable to sense glare-producing light, and a circuit that is responsive to the ambient and glare light sensors and which establishes a reflectance level of the reflective element. The circuit includes a sensor-responsive device and a controller. The sensor-responsive device produces an output that is a function of light sensed by one of the glare and ambient light sensors. The controller connects one of the glare and ambient light sensors at a time with the sensor-responsive device in order to establish the ambient and glare light levels and thereby the reflectance level of the reflective element.

A vehicle rearview mirror system, according to another aspect of the invention, includes an electro-optic reflective element and ambient light sensor that is operable to sense ambient light, a glare light sensor that is operable to sense glare-producing light, and a circuit that is responsive to the ambient and glare light sensors and which produces an output that establishes a reflectance level of the reflective element.

The circuit includes a charge accumulation device, a comparison function and a controller. The comparison function compares an output of the charge accumulation device with a reference. The controller connects one of the glare and ambient light sensors at a time with the charge accumulation device and establishes the ambient and glare light levels and thereby the reflectance level of the reflective element from the comparison function. The controller establishes light levels as a function of time for the output of the accumulation device to reach the reference.

A vehicle rearview mirror system, according to another aspect of the invention, includes an interior rearview mirror assembly having an interior electro-optic reflective element and at least one exterior rearview mirror assembly having an exterior electro-optic reflective element. The system further includes an ambient light sensor that is operable to sense ambient light, a glare light sensor that is operable to sense glare-producing light, and a circuit that is responsive to the ambient and glare light sensors and which establishes reflectance levels of the interior reflective element and the exterior reflective element. The circuit includes a sensor-responsive device and a controller. The sensor-responsive device produces at least one output that is a function of light sensed by the glare and ambient light sensors. The controller connects one of the glare and ambient light sensors at a time with the sensor-responsive device to establish the ambient and glare light levels and thereby the reflectance levels of the interior reflective element and the exterior reflective element.

The various aspects of the present invention utilize common integration elements to measure the light sensors sequentially such that errors due to, for example, component variations are corresponding for both glare and ambient measurements. This facilitates use of mass-produced silicon sensors and avoids the need for matching of components. The various aspects of the invention also achieve sensing of wide input light level dynamic range using off-the-shelf light sensors.

According to another aspect of the present invention, an electrochromic rearview mirror system includes a display which is viewable through a mirrored surface of the rearview mirror system. The mirror system includes a display intensity control which is operable to adjust an intensity of the display in at least part of its operating range in response to a brightness level of a scene rearward of the vehicle.

The control may be operable as a function of the ambient light levels (from a forward facing and/or rearward facing light sensor) and a value representative of the amount of light impinging the rearward facing rearview mirror surface. The control may be further responsive to a modulating effect of an electrochromic cell of the electrochromic rearview mirror system.

According to another aspect of the present invention, an electrochromic rearview mirror system includes a rearview mirror assembly having an electrochromic reflective element and a display operable to project light through the reflective element. The mirror system includes a control operable to adjust an intensity of the display. The mirror system also includes an ambient light sensor operable to detect ambient light levels generally at the mirror assembly and to generate an output signal indicative of an ambient light value, and a glare sensor operable to detect glare or light impinging on the reflective element of the mirror assembly and to generate an output signal indicative of a glare light value. The control is operable to control the intensity of the display as a function of a modulation effect of the electrochromic reflective element and the glare value and ambient light value.

The control may control the display intensity of the display in response to a function of the ambient light value and time to limit rapid fluctuations of the display intensity. The control may control a fully compensated display intensity via the following function or equation: $I(fc)=Fn(ME*GV/AV)*Fn(AV, t)*ME-\frac{1}{2}$; where ME is the modulation effect of the reflective element, GV is the glare value, AV is the ambient light value and t is time.

Therefore, the present invention provides an electrochromic rearview mirror system incorporating a display and a display intensity control which includes an intensity adjustment responsive in at least part of its operating range to the brightness of the rearward scene. The display intensity is adjusted to maintain an appropriate intensity level where it is easily viewable by the driver of the vehicle. The display intensity is bright enough to be seen clearly yet not so bright to annoy or distract the driver. The display intensity is also controlled to provide a sufficient contrast ratio against the variable background brightness of the reflected scene.

These and other objects, advantages, purposes and features of the present invention will become apparent upon review of the following specification in conjunction with the drawings.

DESCRIPTION OF THE PREFERRED EMBODIMENTS

Figure 1:
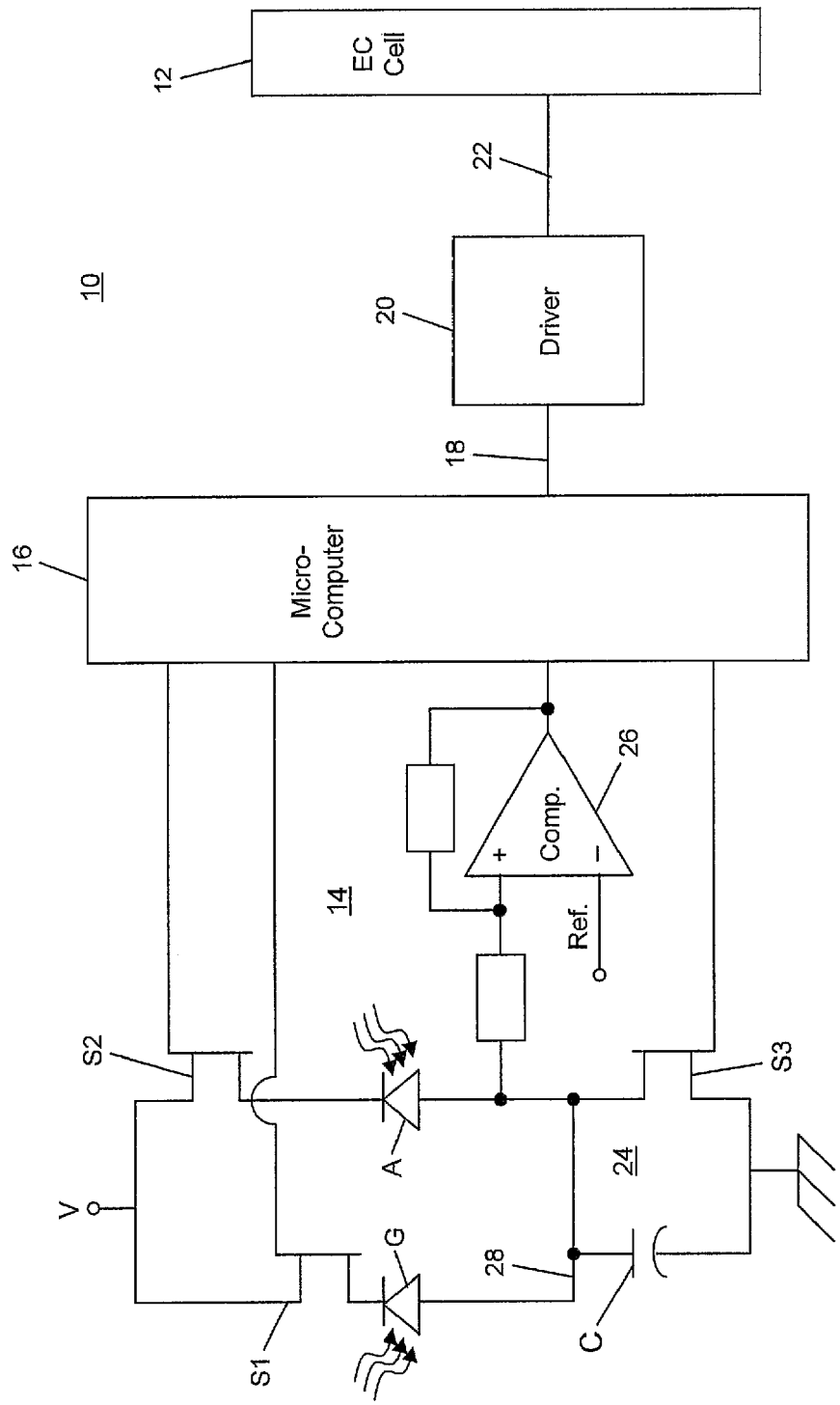
FIG. 1 is an electrical schematic diagram of a vehicle rearview mirror system in accordance with the present invention.

Referring now specifically to the drawings, and the illustrative embodiments depicted therein, a vehicle rearview mirror system 10 includes an electro-optic reflective element 12, an ambient light sensor A that is operable to sense ambient light, a glare light sensor G that is operable to sense glare-producing light, and a circuit 14 that responds to ambient light sensor A and glare light sensor G and which establishes a reflectance level of reflective element 12 (FIG. 1). Circuit 14 includes a controller 16, which may be defined by a microcontroller, such as a microcomputer, which produces an output 18 indicative of a desired reflectance level of reflective element 12, and a driver 20 which produces an output signal at 22 which establishes the reflectance level of reflective element 12. Driver 20 may be of various configurations. One such configuration includes a switching device which is operable by controller 16 at a particular duty cycle to establish the reflectance level of reflective element 12, such as disclosed in commonly assigned U.S. Pat. No. 6,056,410, issued to Hoekstra et al., and U.S. Pat. No. 6,089,721, issued to Schierbeek, the disclosures of which are hereby incorporated herein by reference.

Circuit 14 includes a sensor-responsive device 24 defined by a capacitor C and a comparator 26 that is connected with ambient light sensor A and glare light sensor G. Comparator 26 may be a separate device or may be incorporated as one or more inputs of microcomputer 16. Circuit 14 includes switches S1, S2 and S3, which are electronic switches, such as field effect transistors (FET), that are operated by outputs of controller 16. Alternatively, bipolar transistors may be used. Switch S1 selectively connects glare light sensor G between a voltage source V and a terminal 28 of capacitor C. The other terminal of capacitor C is connected to chassis or ground. Switch S2 selectively connects ambient light sensor A with terminal 28 of capacitor C. Switch S3 is in parallel with capacitor C. Terminal 28 is connected with the non-inverting input of comparator 26. The inverting input of comparator 26 is connected with a reference voltage. The reference voltage may be developed by any known means, such as by a voltage divider connected with voltage source V, or the like. In the embodiment illustrated in FIG. 1, the reference voltage is fixed. However, in the other embodiments described below, the reference voltage may be variable. Also, other component arrangements may perform the same function. By way of example, the capacitor may be connected with the voltage source and the light sensors may be connected between the capacitor and ground.

Figure 2A:
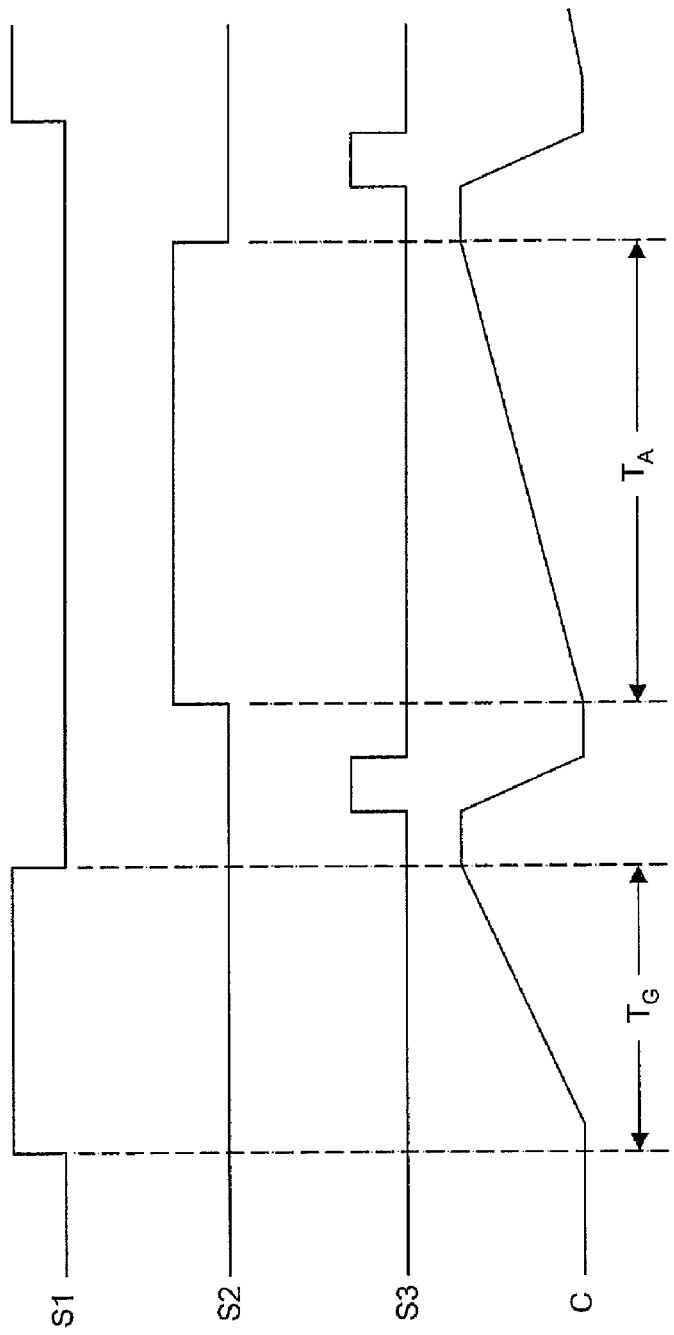
FIGS. 2a and 2b are diagrams illustrating the operation of the rearview mirror system in FIG. 1.
Figure 2B:
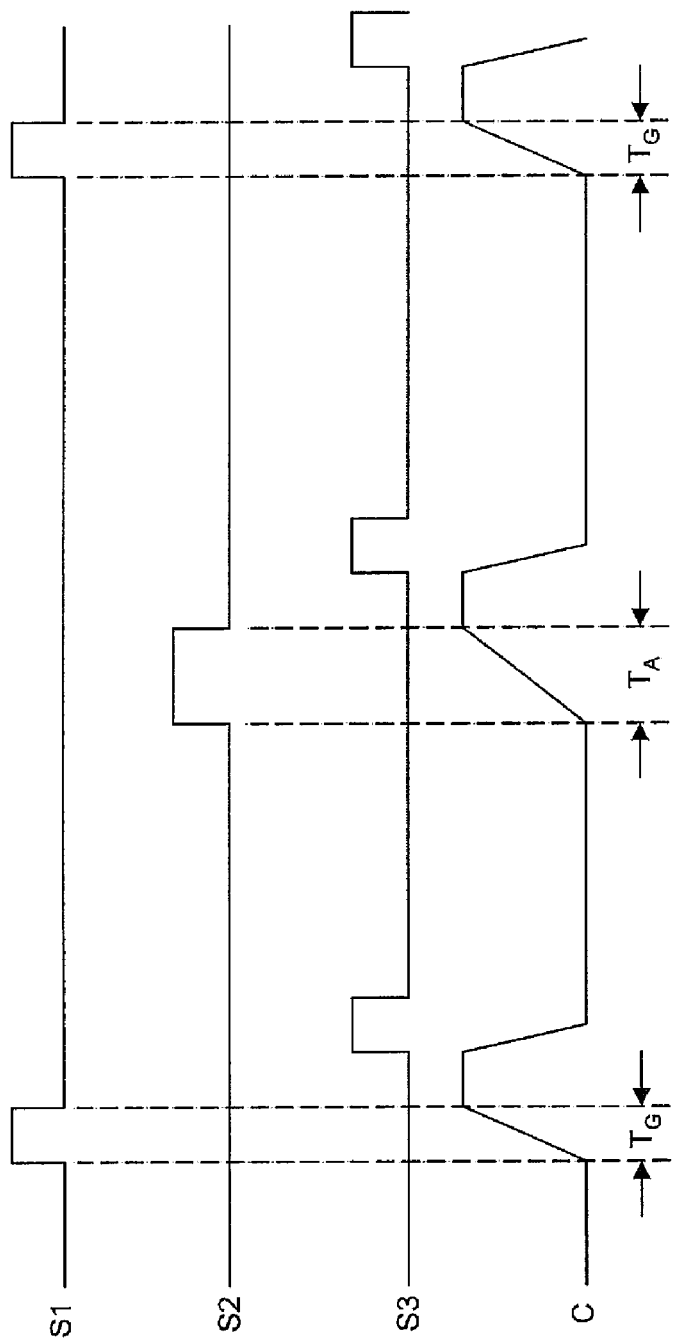

Controller or microcomputer 16 operates switches S1, S2 and S3 to selectably charge and discharge capacitor C. For example, controller 16 may first actuate switch S1. Referring to FIGS. 2a and 2b, with switch S1 actuated, capacitor C is charged by a current through glare light sensor G developed by voltage V. The current charging capacitor C is a function of the amount of light sensed by glare light sensor G. The more light sensed by glare light sensor G, the faster capacitor C is charged. As capacitor C is charged, a voltage developed at terminal 28 is compared by comparator 26 against the reference voltage. When the voltage across capacitor C reaches the reference voltage, controller 16 causes switch S1 to open. The accumulation time interval between the closing of switch S1 and the opening of switch S1 is defined as the glare time interval Tg. After a short duration of time after switch S1 has been opened, controller 16 causes switch S3 to close for a period of time, thereby discharging capacitor C. After another brief duration of time, controller 16 closes switch S2 which causes a current to flow through ambient light sensor A, thereby charging capacitor C at a rate that is a function of the light sensed by ambient light sensor A. When the voltage at terminal 28 reaches the reference voltage of comparator 26, the output of comparator 26 changes state which is monitored by controller 16. In response, controller 16 causes switch S2 to open, thereby defining the end of ambient charge accumulation period Ta. After a brief duration of time, controller 16 again closes switch S3, thereby again discharging capacitor C.

FIG. 2a illustrates a situation in which glare light sensor G is sensing a relatively low glare light level, and ambient light sensor A is sensing a relatively low ambient light level. This results in relatively long accumulation periods Tg and Ta. FIG. 2b illustrates a situation where glare sensor G senses a relatively high glare light level, and ambient light sensor A senses a relatively high ambient light level. Therefore, in the situation illustrated in FIG. 2b, accumulation periods Tg and Ta are relatively short. Controller 16 responds to the length of accumulation periods Tg and Ta in order to determine a ratio of glare light level to ambient light level, or G/A. By determining the ratio G/A and by utilizing common capacitor C and comparator 26, causes of common mode error are significantly reduced. This is because any errors will be common to both determinations Tg and Ta. Therefore, when a ratio is taken, the common sources of errors are cancelled as would be understood by the skilled artisan. The initiation of a cycle of determination of Tg and Ta may be initiated at the end of the prior determination of Tg and Ta. This would provide a free running system. Alternatively, each cycle could be initiated at a fixed time that is set in order to accommodate a maximum allowable value. This may simplify the software run by microcomputer 16. However, both techniques are equally effective at determining G/A.

As disclosed in commonly assigned U.S. Pat. No. 4,793,690 issued to Gahan et al., the disclosure of which is hereby incorporated herein by reference, it is known that the glare tolerance $G_T$ may be calculated by the following equation:

$$G_T = CM^N + B; \quad (1)$$

where C and B are constants, M is a measure of modified ambient light level, and N is a constant. Modified ambient light level utilizes time-adapted filtering to remove transients from the sensed ambient light and to match the adaptation of the eye as taught in the '690 patent, reference above. N may be varied, such as between 0.8 and 1.3, to adjust the shape of the resulting curve.

Figure 8:
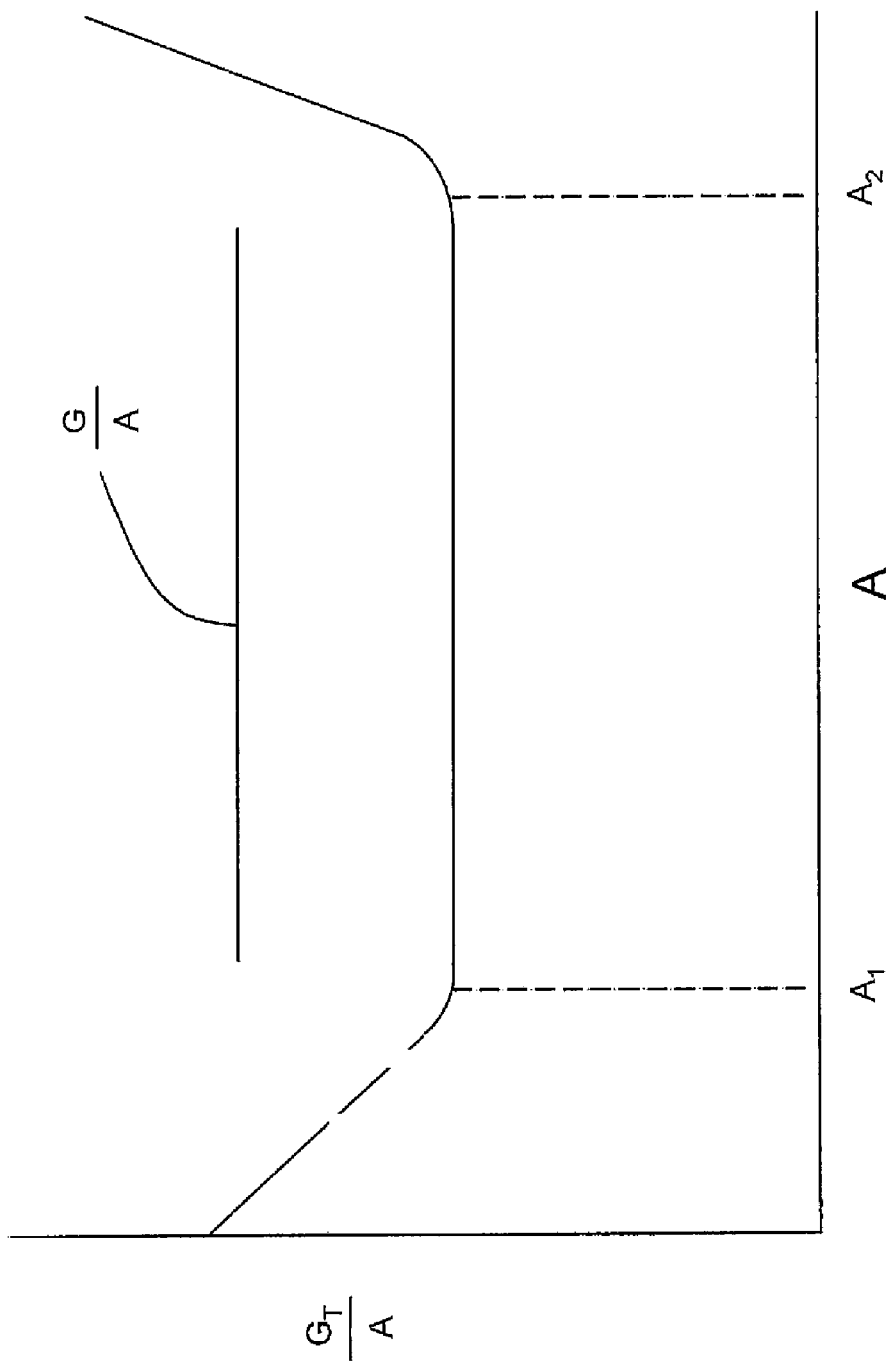
FIG. 8 is a diagram illustrating the operation of the rearview mirror system in FIG. 1.

For values of N that are close to unity, the ratio of $G_T/A$ is reasonably linear as illustrated between points A1 and A2 in FIG. 8. The circuit 14 determines a value of G/A, which is also a ratio, as illustrated by a generally horizontal line in FIG. 8. Conveniently, controller 16 may make a straightforward comparison of the value of G/A as measured by circuit 14 and compare it with the value of GT/A and generate an appropriate drive signal with driver 20 in order to adjust the reflectance level of reflective element 12 to bring the value of glare sensed by the driver in line with the glare tolerance of the driver. This ratio of G/A causes variables that may affect the sensing of glare and ambient light to be common and, therefore, cancelled. One exception may be dark current generated by the sensors, which varies by the duration of the exposure time. Therefore, other supplemental techniques are provided herein to further reduce dark current errors.

In the illustrated embodiment, glare light sensor G and ambient light sensor A may be semiconductor devices, namely, phototransistors, photodiodes, or the like. Such semiconductor devices are relatively inexpensive and readily available and do not create difficulties with end-of-product-life disposal. The present invention is capable of producing a value of G/A that is relatively linear within the range of 0.01 lux to 100 lux.

Figure 3:
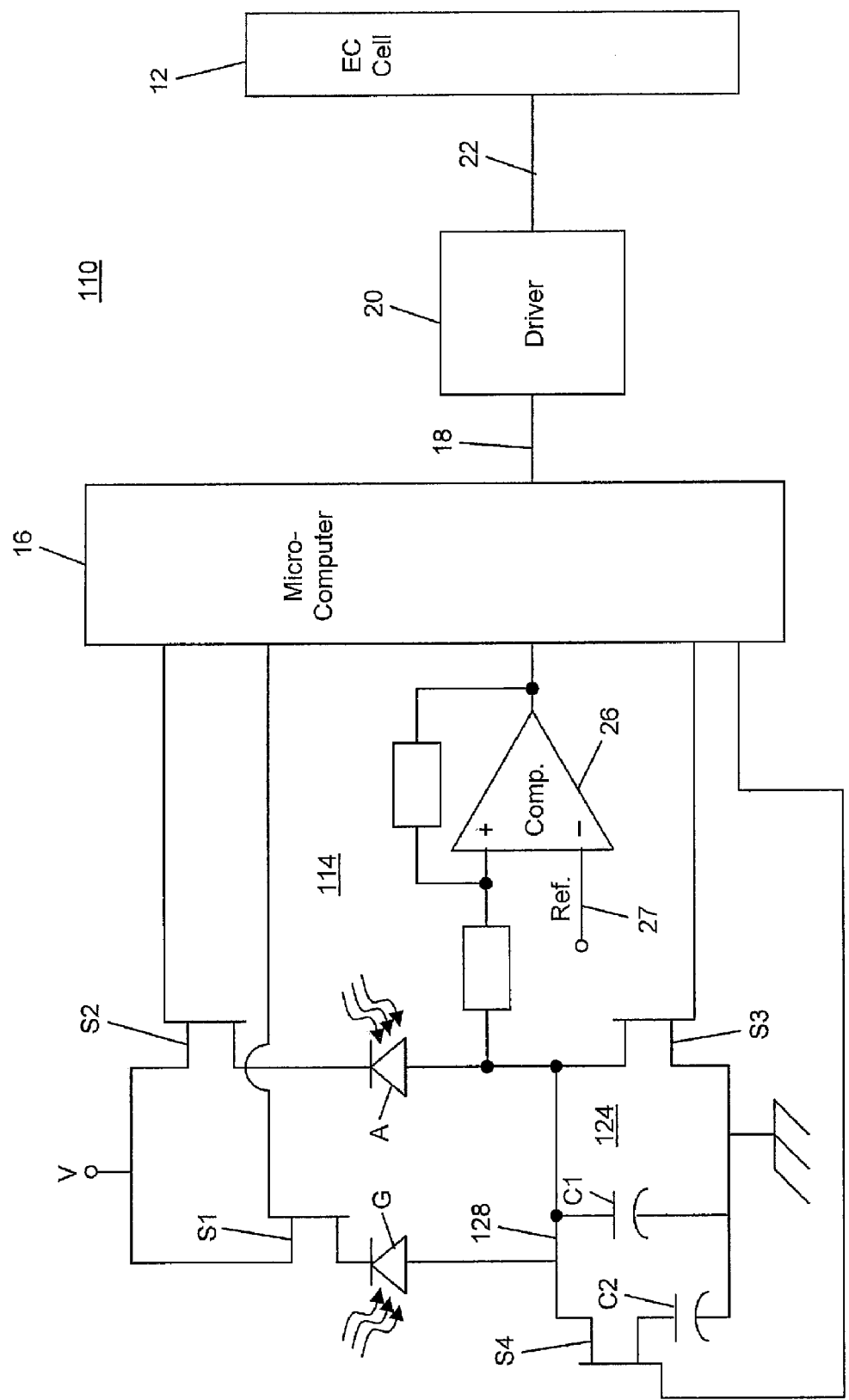
FIG. 3 is the same view as FIG. 1 of an alternative embodiment thereof.

In an embodiment illustrated in FIG. 3, a vehicle rearview mirror system 110 includes a circuit 114 with a second capacitor C2 and a fourth switch S4. Switch S4 is under the control of controller 16 and is operable to selectively place capacitor C2 in parallel with capacitor C1. Under generally low ambient light conditions, controller 16 would cause switch S4 to be opened, thereby using only capacitor C1 to be charged by the respective glare light sensor G and ambient light sensor A. In relatively high light conditions, controller 16 could cause switch S4 to be conducting thereby placing capacitor C2 in parallel with C1. This allows the voltage at terminal 128 to accumulate to the level of the reference voltage in a longer accumulation period than capacitor C1 alone. Thus, controller 16 may utilize capacitor C1 alone and determine whether the level of voltage on terminal 128 reaches the reference within the maximum duration set for the accumulation period. It should be understood that, although one additional switched capacitor is illustrated in FIG. 3, a series of switched capacitors may be individually controlled by controller or microcomputer 16 in a similar fashion, as would be understood by the skilled artisan. This technique makes better use of the resolution of the microcomputer's internal timer.

Figure 4:
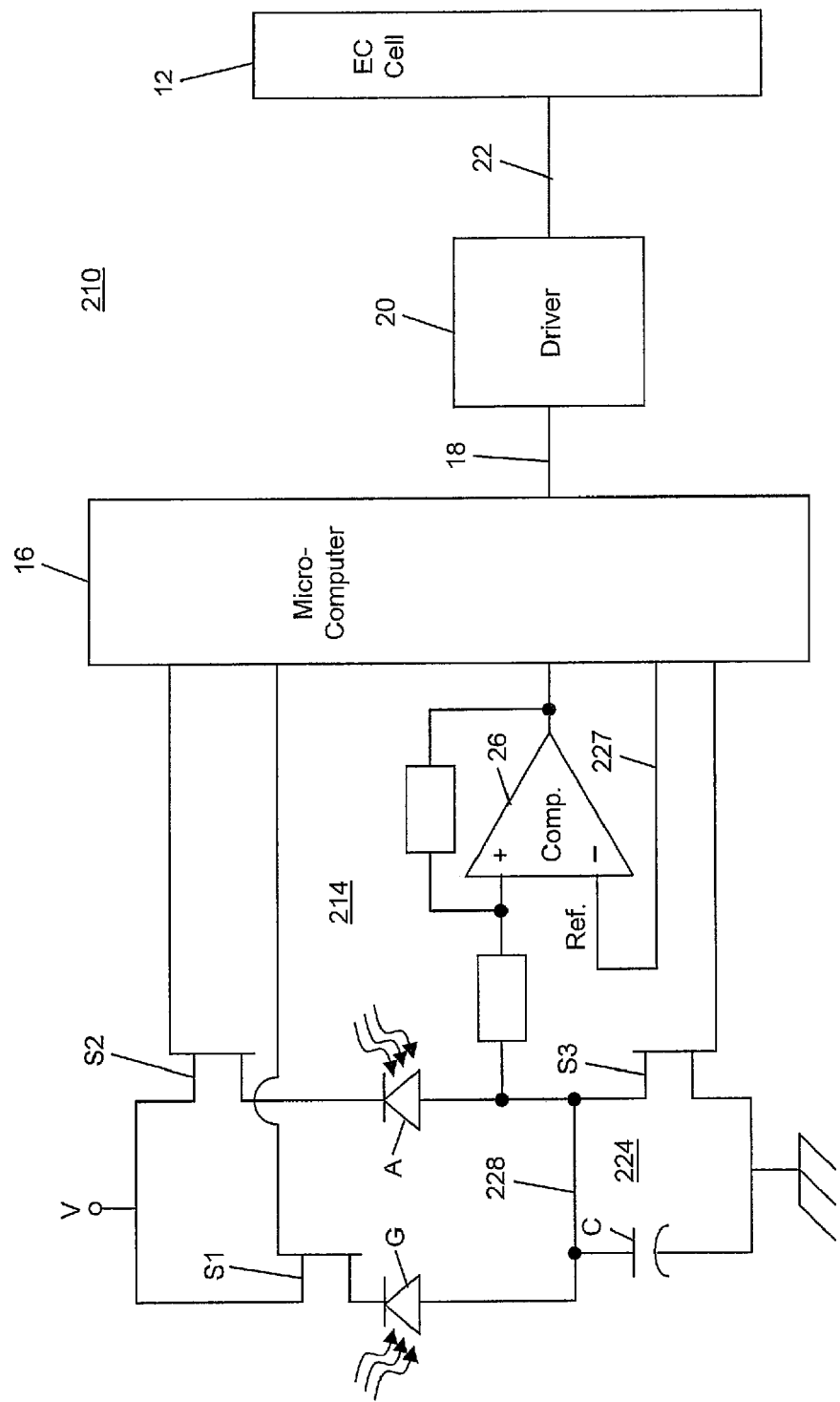
FIG. 4 is the same view as FIG. 1 of another alternative embodiment thereof.

A vehicle rearview mirror system 210 is illustrated in FIG. 4 in which a voltage reference 227 provided to comparator 26 is produced by microcomputer 16. Controller or microcomputer 16 may produce reference 227 at a level which is a function of light levels sensed by the circuit 224. Thus, for example, in high light conditions, controller 16 may set reference 227 at a relatively high level because the voltage at terminal 228 will rise relatively quickly in the manner set forth in FIG. 2a. In contrast, during low light conditions, controller 16 may produce a lower reference voltage 227. In this fashion, the voltage at terminal 228 will reach the reference 227 at a shorter accumulation period than would otherwise occur. This allows the accumulation period to be within a shorter range of periods and thereby accommodate a greater range of light levels by the vehicle rearview mirror system.

Figure 5:
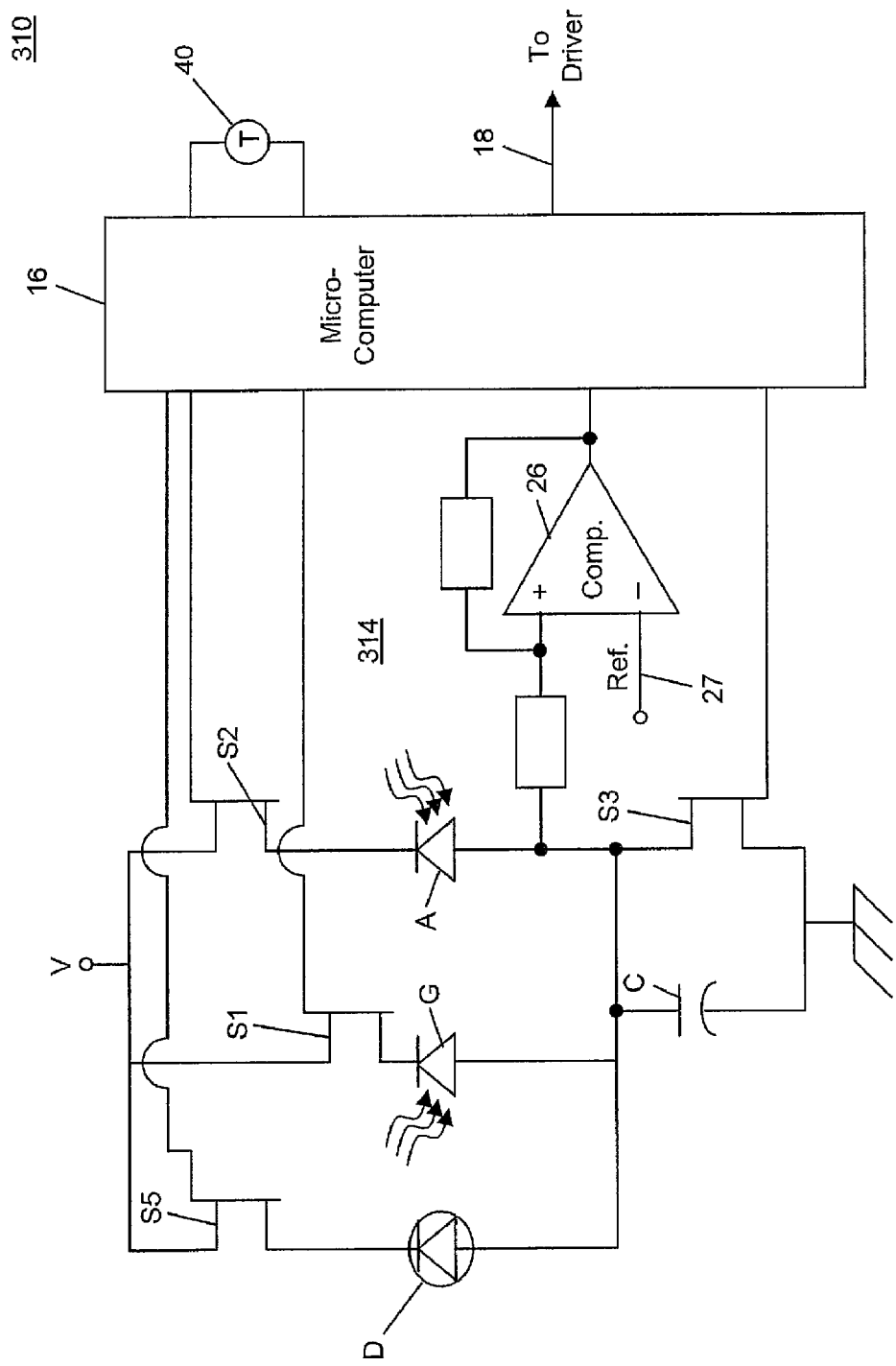
FIG. 5 is the same view as FIG. 1 of yet another alternative embodiment thereof.

Although the vehicle rearview mirror system, according to the various embodiments disclosed herein, reduces sources of common mode errors, it may be desirable to provide additional functions to further reduce dark-current errors. For example, at low light levels and relatively high temperatures, dark currents can greatly exceed the current produced as a result of sensed light. It may be desirable to provide compensation for temperature variations. In an embodiment illustrated in FIG. 5, a vehicle rearview mirror system 310 includes a circuit 314 having a temperature compensation in the form of shielded light sensor D which is not exposed to light. In the same fashion that controller 16 accumulates charge with one of the glare sensors G and ambient sensors A connected with capacitor C, circuit 314 also selectively connects sensor D with capacitor C during a third accumulation period. This is accomplished by controller or microcomputer 16 actuating a fifth switch S5 to place sensor D in series between voltage source V and capacitor C. Because the dark current produced by sensor D will be similar to the dark current produced by sensor G and sensor A, controller 16 can compensate for dark current by utilizing the information obtained from measuring the dark current produced by sensor D.

Circuit 314 may also include temperature compensation in the form of a temperature sensor 40 monitored by microcomputer 16 in order to measure ambient temperature conditions. Based upon a lookup table or a formula stored in controller or microcomputer 16, controller 16 may utilize the temperature reading detected by temperature sensor 40 in order to determine a value of dark current produced by sensors G and A. This also provides an additional technique for further reducing the effect of dark currents especially during extreme temperature conditions. It should be understood that the temperature compensation techniques disclosed herein can be used separately or in combination.

As indicated above, automatic dimming circuitry used in electrochromic mirror assemblies (such as disclosed in U.S. Pat. Nos. 4,793,690; 4,886,960; 4,799,768; 4,443,057 and 4,917,477, the entire disclosures of which are hereby incorporated by reference herein) may utilize one or more (typically two) photo sensors (such as photo resistors or photo diodes or photo transistors) to detect glaring and/or ambient lighting. For example, a silicon photo sensor, such as a TSL235R Light-to-Frequency converter (available from Texas Advanced Optoelectronic Solutions Inc. of Plano, Tex.) can be used as such photo sensors. Such light-to-frequency converters comprise the combination of a silicon photodiode and a current-to-frequency converter on a single monolithic CMOS integrated circuit. Alternately, a photo sensor that converts ambient light to a digital signal capable of direct feed into a microprocessor (or into a vehicle bus system, such as a LIN or CAN system or an SMBus) can be used. For example, a TSL2550 light sensor can be used that converts light intensity to a digital output (and is available from Texas Advanced Optoelectronic Solutions Inc. of Plano, Tex.). The TSL2550 Light-to-Digital photo sensor uses an all-silicon technique that combines two photodetectors to measure light brightness as perceived by the human eye, and calculates light intensity in units of lux. One photo sensor is sensitive to both visible and infrared light, while the other is sensitive only to infrared light. By such a combination, the infrared component of detected light is compensated for, and the output of the part is approximate the response of the human eye, thus obviating a need for a photopic filter. The ratio of infrared to visible light can be calculated and used to determine the type of light source (for example, incandescent or sunlight). Thus, for example, glaring light from headlamps (typically incandescent or high intensity discharge) can be distinguished from moonlight, sunlight, neon light, and the like.

Figure 6:
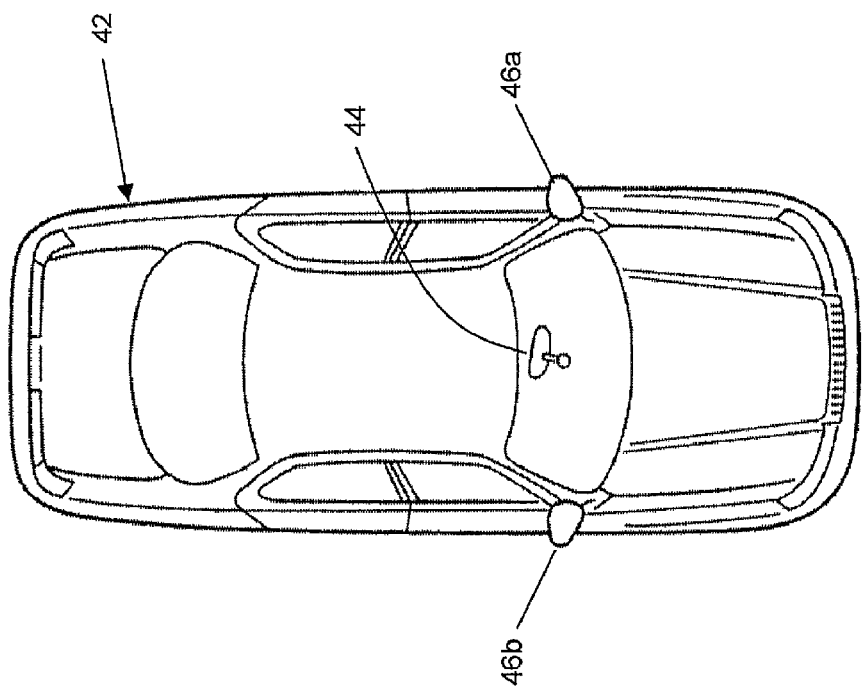
FIG. 6 is a top plan view of a vehicle equipped with a rearview mirror system in accordance with the present invention.
Figure 7:
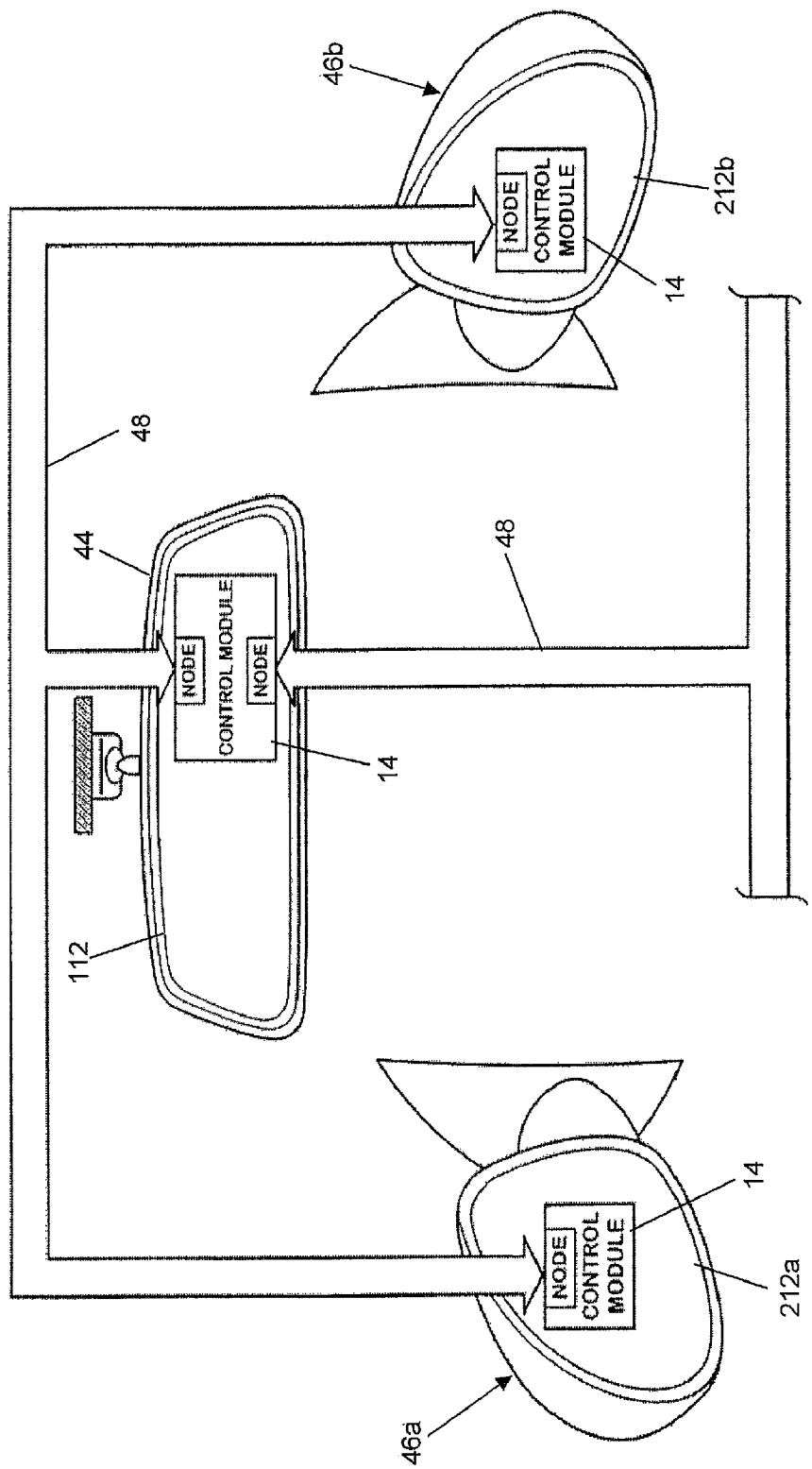
FIG. 7 is a block diagram of the vehicle rearview mirror system of FIG. 6.

Vehicle rearview mirror system 10 is illustrated in FIG. 6 in use with a vehicle 42. Vehicle 42 is shown having an interior rearview mirror assembly 44 and exterior rearview mirror assembly 46a on a driver side of the vehicle and exterior rearview mirror assembly 46b on a passenger side of the vehicle. Circuit 14 may produce reflectance levels for an interior reflective element 112 in interior rearview mirror assembly 44 and the exterior reflective elements 212a in exterior mirror assembly 46a and 212b in exterior mirror assembly 46b. Circuit 14 may be positioned in interior rearview mirror assembly 14 with the reflective elements produced therein communicated via vehicle communication bus 48. Alternatively, circuit 14 may be positioned in more than one of the mirror assemblies 44, 46a, 46b and may individually control the respective reflectance level for that mirror reflective element. If circuit 14 is positioned within interior rearview mirror assembly 44, ambient light sensor A may face in a generally forward direction with respect to the vehicle and glare sensor G facing generally rearward with respect to the direction of the vehicle. Alternatively, circuit 14 may be positioned in an exterior rearview mirror assembly 46a, 46b with glare light sensor G and ambient light sensor A facing generally rearward with respect to the vehicle. In such circumstances, the glare light sensor may be aimed along a generally horizontal axis and the ambient light sensor along another axis that deviates from the horizontal axis. The deviation may be between 10 degrees and 70 degrees, as disclosed in commonly assigned U.S. Pat. No. 5,659,423 issued to Schierbeek et al., the disclosure of which is hereby incorporated herein by reference.

Circuits 114, 214, 314 may be manufactured using application specific integrated circuit (ASIC) technology. In the case of a circuit position within interior rearview mirror assembly 44, an ASIC could be utilized combining one of the light sensors G and A with all or a portion of the rest of circuits 14, 214 and 314 with the other light sensor G, A by itself or with the portion of the circuit not included with the other light sensor. If both light sensors are on the same side of the circuit, such as disclosed in Schierbeek et al. '423, referenced above, a single ASIC could be utilized.

Thus, the present invention provides automatic dimming circuitry without the use of tandem light sensors and without light signals that are integrated over predetermined integration periods.

Figure 9:
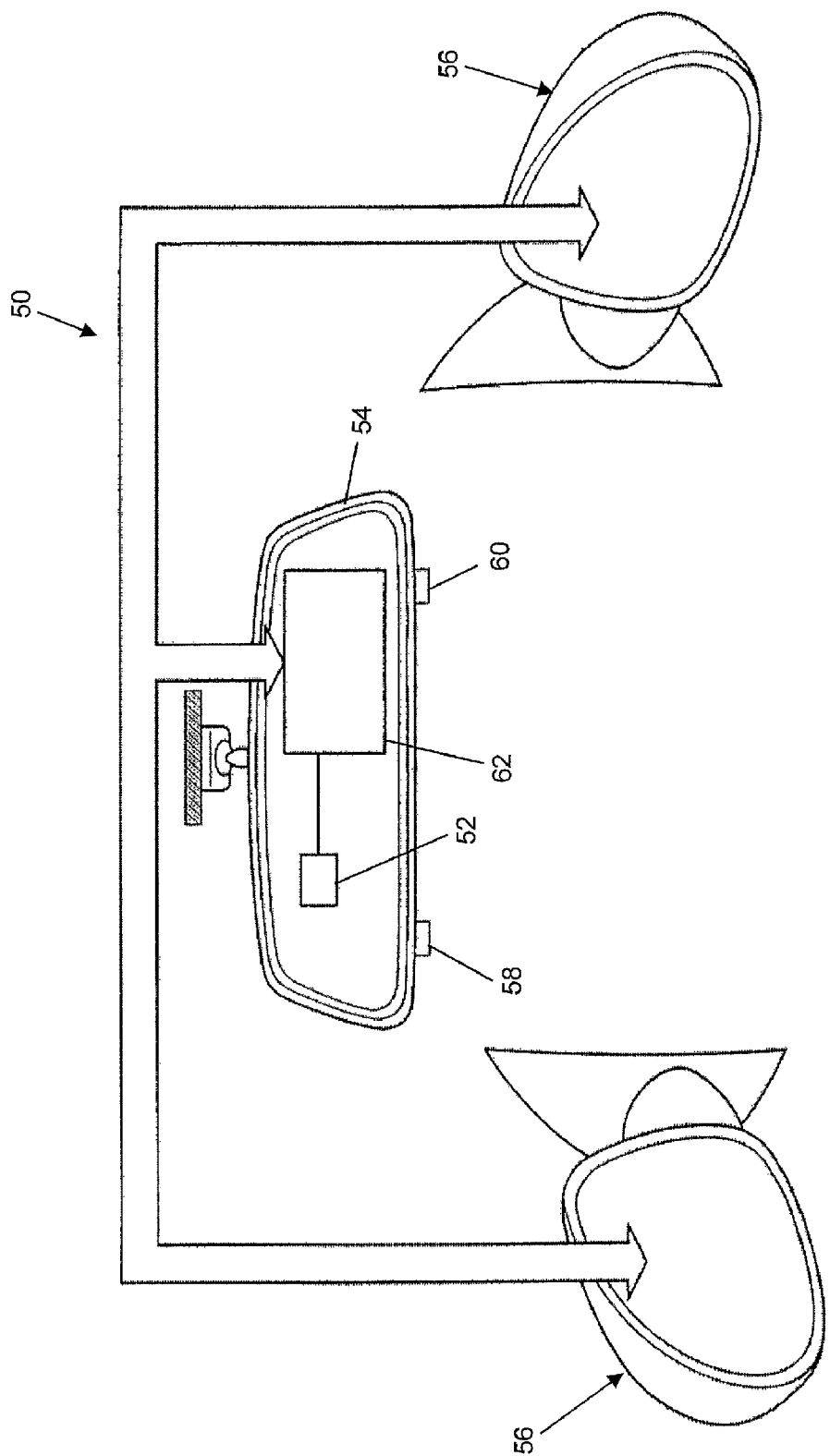
FIG. 9 is a block diagram of another vehicle rearview mirror system in accordance with the present invention.

Referring now to FIG. 9, an electrochromic rearview mirror system 50 for a vehicle may include a mirrored element and a display 52 which is viewable through the mirrored element. The rearview mirror system 50 may include an interior rearview mirror assembly 54 and/or one or more exterior, side mounted rearview mirror assemblies 56. The electrochromic mirror assembly or assemblies 54, 56 may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and in U.S. patent application Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference.

The display 52 may comprise a display-on-demand type of display, such as the types disclosed in commonly assigned U.S. Pat. Nos. 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which are all hereby incorporated herein by reference. With such a display, it is not only desirable to adjust the display brightness according to ambient lighting conditions, but it is also desirable to adjust the display brightness such that a sufficient contrast ratio is maintained against the variable background brightness of the reflected scene. Also, it may be desirable to compensate for changes in transmission of the electrochromic device effected to control rearward glare sources, in order that the display brightness appears to be maintained at a generally constant level.

The present invention may include an interior rearview mirror assembly which is mounted to an interior surface of the windshield or at the headliner of the vehicle. The interior rearview mirror assembly may include a transflective one way mirror, such as disclosed in commonly assigned U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. The mirror reflective element (behind which the display element or screen is disposed so that the image displayed is visible by viewing through the mirror reflective element) of the interior mirror assembly may comprise a transflective mirror reflector such that the mirror reflective element is significantly transmitting to visible light incident from its rear (i.e. the portion furthest from the driver in the vehicle), with at least about 15% transmission preferred, at least about 20% transmission more preferred, and at least about 25% transmission most preferred, while the mirror reflective element is simultaneously substantially reflective to visible light incident from its front (i.e. the position closest to the driver when the interior mirror assembly is mounted in the vehicle), with at least about 60% reflectance preferred, at least about 70% reflectance more preferred, and at least about 75% reflectance most preferred.

A transflective electrochromic reflective mirror element may be used (such as is disclosed in U.S. patent application Ser. No. 09/793,002, entitled VIDEO MIRROR SYSTEMS INCORPORATING AN ACCESSORY MODULE, filed Feb. 26, 2001, now U.S. Pat. No. 6,690,268 and in U.S. Pat. Nos. 5,668,663 and 5,724,187, the entire disclosures of which are hereby incorporated by reference herein) that comprises an electrochromic medium sandwiched between two substrates. The front substrate (i.e. closest to the driver when the interior mirror assembly is mounted in the vehicle) may comprise a glass substrate having a transparent electronic conductive coating (such as indium tin oxide or doped tin oxide) on its inner surface (and contacting the electrochromic medium). Optionally, the front substrate of the twin-substrate electrochromic cell that sandwiches the electrochromic medium comprises a glass substrate having a thickness of about 1.6 millimeters or less; preferably, about 1.1 millimeters or less. The rear substrate (i.e. furthest from the driver when the interior mirror assembly is mounted in the vehicle) may comprise a glass substrate having a transflective mirror reflector on the surface thereof that the electrochromic medium contacts (such a configuration being referred to as a "third-surface" reflector in the electrochromic mirror art).

For example, the mirror reflector may comprise a transparent semiconductor/metal conductor/transparent semiconductor multilayer stack, such an indium tin oxide/silver/indium tin oxide stack. For example, a third-surface electrochromic mirror reflective element may be used comprising a front substrate comprising an about 1.1 mm thick glass substrate having a half-wave indium tin oxide (ITO) coating of about 12 ohms/square sheet resistance on its inner surface; a rear substrate comprising an about 1.6 mm thick glass substrate having a transflective mirror reflector thereon comprising an about 350 angstrom thick silver metal layer sandwiched between an about 800 angstrom thick indium tin oxide transparent semiconductor layer and another about 800 angstrom thick indium tin oxide transparent semiconductor layer; and with an electrochromic solid polymer matrix medium, such as is disclosed in U.S. Pat. No. 6,245,262 (the entire disclosure of which is hereby incorporated by reference herein), disposed between the transflective mirror reflector of the rear substrate and the half-wave indium tin oxide layer of the front substrate. Visible light reflectivity of the transflective electrochromic mirror element may be about 60-65%; and light transmission may be about 20-25%. For example, with a TFT LCD video display disposed behind the rear substrate of such a third-surface transflective electrochromic mirror reflective element in a "display-on-demand" configuration, the presence of (and image displayed by) the video display screen is only principally visible to the driver (who views through the transflective mirror reflective element) when the video display element is powered so as to project light from the rear of the mirror reflective element.

Optionally, in applications in which a TFT LCD video screen is implemented, a single high-intensity power LED, such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and available from Lumileds Lighting LLC of San Jose, Calif., may be used as a backlight for the TFT LCD video screen. Alternately, a plurality of such single high-intensity power LEDs (such as an array of two or of four such power LEDs) may be placed behind the TFT LCD video screen so that the intense white light projected from the individual single high-intensity power LEDs passes through the TFT LCD element and through the transflective electrochromic element, and may produce a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes may be used for backlighting and optionally can be used in conjunction with LED backlighting.

The electrochromic rearview mirror system of the present invention includes two image sensors or illumination sensors: one forward facing sensor 58 which may provide a basis for calculating or determining a value representative of ambient lighting conditions around the vehicle, and one rearward facing sensor 60 which may be useful in determining the degree of glare impinging the mirror surface and consequently being reflected toward the driver's eyes. The sensor or sensors 58, 60 may be imaging sensors, and may be imaging array sensors, such as a CMOS sensor or a CCD sensor or the like, such as disclosed in commonly assigned U.S. Pat. Nos. 5,550,677; 5,670,935; 5,796,094; and 6,097,023, which are hereby incorporated herein by reference. Optionally, the control 62 of the present invention may be operable to receive data (which is indicative of ambient light levels) from one or more existing imaging sensors on the vehicle, such as an imaging sensor for a vehicle vision system, such as a vehicle vision system utilizing the principles disclosed in U.S. Pat. Nos. 5,550,677; 5,670,935; and 6,201,642, and/or in U.S. patent application Ser. No. 09/199,907, filed Nov. 25, 1998 by Bos et al. for WIDE ANGLE IMAGE CAPTURE SYSTEM FOR VEHICLE, now U.S. Pat. No. 6,717,610, and Ser. No. 09/372,915, filed Aug. 12, 1999 by Bos et al. for VEHICLE IMAGING SYSTEM WITH STEREO IMAGING, now U.S. Pat. No. 6,396,397, which are hereby incorporated herein by reference, an imaging sensor for a lane departure warning system, an imaging or light sensor for a rain sensor, such as disclosed in U.S. Pat. Nos. 6,313,454; 6,353,392; and 6,320,176, and/or the like, without affecting the scope of the present invention.

A value representative of ambient lighting conditions may otherwise be derived from a combination of forward and rearward facing light sensors. The resultant value representative of the ambient light level is used to estimate the sensitivity of the driver's eyes and thus provide the appropriate degree of intensity reduction of the reflected image to avoid reduced forward vision capability.

The electrochromic rearview mirror system of the present invention, as equipped or associated with a forward facing light sensor 58 and a rearward facing light sensor 60, may calculate an ambient light value AV based on the value of the forward facing light sensor or a combination of values from the forward and rearward facing light sensors. The ambient light value AV is representative of the ambient light level surrounding the vehicle.

The ambient light value AV is then used to determine a driver's eyes' sensitivity value SV, based on a relationship between the ambient light value AV and the sensitivity value SV, as described in commonly assigned U.S. Pat. Nos. 4,793,690 and 4,799,768, which are hereby incorporated herein by reference. The value of the sensitivity SV may be divided into two values: SV1, which represents the value above which a light source is considered a discomfort at a particular ambient lighting level, and SV2, which represents the value above which a light source becomes debilitating at a particular ambient lighting level. A debilitating condition arises when the ability to discern detail in the general field of view is reduced. A relationship is selected where the sensitivity value SV, as a function of the ambient light value AV, is between the sensitivity values SV1 and SV2.

A light value GV, which is representative of the quantity of light impinging the rearward facing sensor, and thus the rearview mirror surface, is determined from the value of the rearward facing light sensor. In those cases where the sensed light value GV exceeds the maximum acceptable sensitivity value SV, a modulating effect ME of the electrochromic cell in the light path is used to reduce the light value GV toward the sensitivity value SV, such that GV*ME=SV, to the extent that a sufficient modulating effect is available. The degree of modulation ME may be controlled by the voltage V applied to the electrochromic element, so that the degree of modulation ME is a function of the applied voltage V.

When a display is associated with the rearview mirror, the intensity of the display is typically controlled between a maximum intensity value I1 and a minimum intensity value I2 as a function of the ambient light condition. The display intensity I is thus a function of the ambient light value AV and time t, and may be a step function, a linear function, a logarithmic function, or any other continuous function, without affecting the scope of the present invention. The time t is included in the relationship to avoid any potentially annoying rapid fluctuations of the display intensity. When the display is viewed through a non-reflecting window or region of the electrochromic cell, it is desirable to correct for the varying modulation of the cell. The modulation effect ME is based on a double pass through the electrochromic medium, while the light from the display only passes once through the electrochromic medium. Therefore, the display intensity may be corrected to a corrected intensity value $I_{(c)}$, according to the following relationship:

$$I_{(C)} = I * ME^{-1/2}. \quad (2)$$

When a display-on-demand information display system is used, bright rearward scenes reduce the contrast ratio between the active regions of the display and the reflected background scene. In order to correct this situation and render the display readable, it is desirable to increase the display illumination by a function of the ratio of the brightness of the rearward scene (after modulation, if such modulation is present) to the ambient light value which controls the nominal illumination intensity. In other words, the display illumination or intensity I may be controlled according to the following relationship:

$$I = Fn((ME*GV)/AV). \quad (3)$$

The function of equation (3) may have a value of one (1) for all cases where the value of (ME*GV)/AV is less than one, since the relationship or function of the intensity I (which is a function of the ambient light level or value AV and time t, as discussed above) may establish an appropriate display intensity regardless of the darkness of the background field in such situations. Therefore, the relationship controlling the fully compensated display intensity I(fc) becomes the following:

$$I_{(fc)} Fn((ME*GV)/AV) * Fn(AV,t) * ME^{-1/2}. \quad (4)$$

Therefore, the present invention provides an electrochromic rearview mirror system which incorporates a display and a display intensity control, which further includes an intensity adjustment responsive in at least part of its operating range to the brightness of the rearward scene. The display intensity control is operable as a function of the ambient light levels (from a forward facing light sensor and/or a rearward facing light sensor) and a value representative of the amount of light impinging the rearward facing rearview mirror surface. The display intensity control is further responsive to a modulating effect of the electrochromic cell.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A rearview mirror system for a vehicle, said rearview mirror system comprising:
    an interior rearview mirror assembly having a transflective electrochromic reflective element, said reflective element having a front surface and a rear surface, said front surface being closer to the driver of a vehicle than said rear surface when said mirror assembly is mounted in a vehicle equipped with said rearview mirror system;
    wherein said transflective reflective element comprises a mirror reflector that partially reflects light incident thereon and that partially transmits light incident thereon and wherein said transflective reflective element is at least about 20 percent transmitting to visible light incident from rearward of said rear surface of said reflective element;
    an ambient light sensor operable to sense ambient light;
    a glare light sensor operable to sense light incident at or near said reflective element;
    wherein said ambient light sensor comprises a silicon photo-diode and associated circuitry commonly formed as an integrated circuit and wherein said glare light sensor comprises a silicon photo-diode and associated circuitry commonly formed as an integrated circuit;
    wherein said glare light sensor converts incident light to a signal processed by a microprocessor;
    wherein said ambient light sensor converts incident light to a signal processed by a microprocessor;
    a control circuit operable to establish a reflectance level of said reflective element, wherein said control circuit is responsive to light detection by at least one of said ambient light sensor and said glare light sensor;
    a display element disposed behind said transflective electrochromic reflective element and operable to display information through said mirror reflector of said transflective electrochromic reflective element and viewable through said mirror reflector of said transflective electrochromic reflective element by a driver of the vehicle when said display element is displaying information, and substantially non-viewable by the driver of the vehicle when said display element is not displaying information;
    wherein said display element comprises at least one of (a) a video display, (b) a backlit liquid crystal display video screen, (c) a backlit TFT liquid crystal display video screen, (d) a liquid crystal display video screen backlit by at least one high-intensity power light emitting diode, and (e) a liquid crystal display video screen backlit by at least one white light light emitting diode; and
    a display intensity control for adjusting display intensity of said display element, said display intensity control adjusting display intensity responsive to a light detection by at least one of said glare light sensor and said ambient light sensor, wherein display intensity is adjusted responsive to at least one of (a) an ambient light level detected by at least one of said ambient light sensor and said glare light sensor and (b) a glare light level detected by at least one of said ambient light sensor and said glare light sensor, said glare light level representative of light impinging a rearward facing surface of said reflective element.

2. The rearview mirror system of claim 1, wherein said display intensity control establishes an appropriate display intensity regardless of the darkness of a background field.

3. The rearview mirror system of claim 1, wherein said control circuit establishes a reflectance level of said reflective element responsive to a ratio of a glare light value to an ambient light value.

4. The rearview mirror system of claim 3, wherein said ratio of glare light value to ambient light value is from about 0.01 lux to at least about 100 lux.

5. The rearview mirror system of claim 3, wherein said control circuit establishes said reflectance level within a relatively linear value of said ratio of glare light value to ambient light value.

6. The rearview mirror system of claim 1, wherein at least one of (a) said control circuit comprises a charge accumulation device, a comparison function and a controller, said comparison function comparing an output of said charge accumulation device with a reference, said controller selectively connecting said glare sensor and said ambient light sensor with said charge accumulation device, (b) said control circuit at least one of (i) alternates connecting said glare light sensor and said ambient light sensor with a charge accumulation device, and (ii) comprises compensation to adapt said control circuit to changes in light levels sensed by said glare and ambient light sensors, and wherein said control circuit comprises a charge accumulation device and a controller, said controller selectively connecting said glare light sensor and said ambient light sensor with said charge accumulation device, wherein said compensation comprises a plurality of voltage reference levels and said control circuit selectively compares an output of said charge accumulation device with one of said voltage reference levels, and (c) said control circuit comprises a drive function that produces a drive signal that is applied to said reflective element, said drive function comprising a switching device, said circuit operating said switching device at a particular duty cycle to establish the reflectance level of said reflective element.

7. The rearview mirror system of claim 1, wherein said associated circuitry of said ambient light sensor comprises a current-to-frequency converter and wherein said associated circuitry of said glare light sensor comprises a current-to-frequency converter.

8. The rearview mirror system of claim 1 further comprising temperature compensation for compensating for temperature variation of at least one of said glare light sensor and said ambient light sensor, and wherein said temperature compensation is responsive to at least one of (a) a reference sensor that is not exposed to light and (b) a temperature sensor.

9. The rearview mirror system of claim 1, wherein said display intensity control controls display intensity in accordance with the equation:

$$I = Fn((ME*GV)/(AV)$$

where I is the display intensity, ME is a modulating effect, GV is a glare light value, and AV is an ambient light value, and wherein display intensity as calculated by said equation has a value of one when the value of (ME*GV)/AV is less than one.

10. The rearview mirror system of claim 1, wherein said ambient light sensor comprises a silicon photo-diode and associated circuitry commonly formed as a monolithic CMOS integrated circuit and wherein said glare light sensor comprises a silicon photo-diode and associated circuitry commonly formed as a monolithic CMOS integrated circuit.

11. The rearview mirror system of claim 1, wherein said transflective reflective element is at least about 60 percent reflective to visible light incident from its front.

12. A rearview mirror system for a vehicle, said rearview mirror system comprising:
   an interior rearview mirror assembly having a transflective electrochromic reflective element, said reflective element having a front surface and a rear surface, said front surface being closer to the driver of a vehicle than said rear surface when said mirror assembly is mounted in a vehicle equipped with said rearview mirror system;
   wherein said transflective reflective element comprises a mirror reflector that partially reflects light incident thereon and that partially transmits light incident thereon and wherein said transflective reflective element is at least about 20 percent transmitting to visible light incident from rearward of said rear surface of said reflective element;
   an ambient light sensor operable to sense ambient light;
   a glare light sensor operable to sense light incident at or near said reflective element;
   wherein said ambient light sensor comprises a silicon photo-diode and associated circuitry commonly formed as a CMOS integrated circuit and wherein said glare light sensor comprises a silicon photo-diode and associated circuitry commonly formed as a CMOS integrated circuit;
   wherein said glare light sensor converts incident light to a signal processed by a microprocessor;
   wherein said ambient light sensor converts incident light to a signal processed by a microprocessor;
   a control circuit operable to establish a reflectance level of said reflective element, wherein said control circuit is responsive to light detection by at least one of said ambient light sensor and said glare light sensor;
   a display element disposed behind said transflective electrochromic reflective element and operable to display information through said mirror reflector of said transflective electrochromic reflective element and viewable through said mirror reflector of said transflective electrochromic reflective element by a driver of the vehicle when said display element is displaying information, and substantially non-viewable by the driver of the vehicle when said display element is not displaying information;
   wherein said display element comprises a liquid crystal display video screen backlit by at least one white light light emitting diode; and
   a display intensity control for adjusting display intensity of said display element, said display intensity control adjusting display intensity responsive to a light detection by at least one of said glare light sensor and said ambient light sensor, wherein display intensity is adjusted responsive to at least one of (a) an ambient light level detected by at least one of said ambient light sensor and said glare light sensor and (b) a glare light level detected by at least one of said ambient light sensor and said glare light sensor, said glare light level representative of light impinging a rearward facing surface of said reflective element.

13. The rearview mirror system of claim 12, wherein said associated circuitry of said ambient light sensor comprises a current-to-frequency converter and wherein said associated circuitry of said glare light sensor comprises a current-to-frequency converter.

14. The rearview mirror system of claim 12 further comprising temperature compensation for compensating for temperature variation of at least one of said glare light sensor and said ambient light sensor, and wherein said temperature compensation is responsive to at least one of (a) a reference sensor that is not exposed to light and (b) a temperature sensor.

15. A rearview mirror system for a vehicle, said rearview mirror system comprising:
   an interior rearview mirror assembly having a transflective electrochromic reflective element, said reflective element having a front surface and a rear surface, said front surface being closer to the driver of a vehicle than said rear surface when said mirror assembly is mounted in a vehicle equipped with said rearview mirror system;
   wherein said transflective reflective element comprises a mirror reflector that partially reflects light incident thereon and that partially transmits light incident thereon;
   wherein said transflective reflective element is at least about 20 percent transmitting to visible light incident from rearward of said rear surface of said reflective element and wherein said transflective reflective element is at least about 60 percent reflective to visible light incident from its front;
   an ambient light sensor operable to sense ambient light;
   a glare light sensor operable to sense light incident at or near said reflective element;
   wherein said ambient light sensor comprises a silicon photo-diode and associated circuitry commonly formed as an integrated circuit and wherein said glare light sensor comprises a silicon photo-diode and associated circuitry commonly formed as an integrated circuit;
   wherein said glare light sensor converts incident light to a signal processed by a microprocessor;
   wherein said ambient light sensor converts incident light to a signal processed by a microprocessor;
   a control circuit operable to establish a reflectance level of said reflective element, wherein said control circuit is responsive to light detection by at least one of said ambient light sensor and said glare light sensor;
   a display element disposed behind said transflective electrochromic reflective element and operable to display information through said mirror reflector of said transflective electrochromic reflective element and viewable through said mirror reflector of said transflective electrochromic reflective element by a driver of the vehicle when said display element is displaying information, and substantially non-viewable by the driver of the vehicle when said display element is not displaying information;
   wherein said display element comprises at least one of (a) a video display, (b) a backlit liquid crystal display video screen, (c) a backlit TFT liquid crystal display video screen, (d) a liquid crystal display video screen backlit by at least one high-intensity power light emitting diode, and (e) a liquid crystal display video screen backlit by at least one white light light emitting diode;
   a display intensity control for adjusting display intensity of said display element, said display intensity control adjusting display intensity responsive to a light detection by at least one of said glare light sensor and said ambient light sensor, wherein display intensity is adjusted responsive to at least one of (a) an ambient light level detected by at least one of said ambient light sensor and said glare light sensor and (b) a glare light level detected by at least one of said ambient light sensor and said glare light sensor, said glare light level representative of light impinging a rearward facing surface of said reflective element; and wherein at least one of (a) said associated circuitry of said ambient light sensor comprises a current-to-frequency converter and wherein said associated circuitry of said glare light sensor comprises a current-to-frequency converter, (b) said rearview mirror system further comprises temperature compensation for compensating for temperature variation of at least one of said glare light sensor and said ambient light sensor, and wherein said temperature compensation is responsive to at least one of (i) a reference sensor that is not exposed to light and (ii) a temperature sensor, and (c) said ambient light sensor comprises a silicon photo-diode and associated circuitry commonly formed as a monolithic CMOS integrated circuit and wherein said glare light sensor comprises a silicon photo-diode and associated circuitry commonly formed as a monolithic CMOS integrated circuit.

16. The rearview mirror system of claim 15, wherein said control circuit comprises a charge accumulation device, a comparison function and a controller, said comparison function comparing an output of said charge accumulation device with a reference, said controller selectively connecting said glare sensor and said ambient light sensor with said charge accumulation device.

17. The rearview mirror system of claim 16, wherein said control circuit at least one of (i) alternates connecting said glare light sensor and said ambient light sensor with said charge accumulation device, and (ii) comprises compensation to adapt said control circuit to changes in light levels sensed by said glare and ambient light sensors and wherein said compensation comprises a plurality of voltage reference levels and said control circuit selectively compares an output of said charge accumulation device with one of said voltage reference levels.

18. The rearview mirror system of claim 16, wherein said control circuit comprises a drive function that produces a drive signal that is applied to said reflective element, said drive function comprising a switching device, said circuit operating said switching device at a particular duty cycle to establish the reflectance level of said reflective element.

19. The rearview mirror system of claim 15, wherein said control circuit establishes a reflectance level of said reflective element responsive to a ratio of a glare light value to an ambient light value.

20. The rearview mirror system of claim 19, wherein said ratio of glare light value to ambient light value is from about 0.01 lux to at least about 100 lux.

21. The rearview mirror system of claim 15, wherein said display element comprises a liquid crystal display video screen backlit by at least one white light light emitting diode, and wherein at least one of (a) said transflective reflective element is at least about 60 percent reflective to visible light incident from its front and (b) said display intensity control establishes an appropriate display intensity regardless of the darkness of a background field.

\* \* \* \* \*